United States Patent [19]

Nakajima

[11] 4,166,369

[45] Sep. 4, 1979

[54] SAFETY DEVICE FOR PRESS BRAKE

[75] Inventor: Masanobu Nakajima, Komatsu, Japan

[73] Assignee: Kabushiki Kaisha Komatsu Seisakusho, Tokyo, Japan

[21] Appl. No.: 894,176

[22] Filed: Apr. 6, 1978

[51] Int. Cl.² .............................................. B21D 55/00
[52] U.S. Cl. .......................................... 72/26; 72/389; 100/53
[58] Field of Search ................... 72/26, 389, 385, 386; 100/53; 425/153; 192/130, 129 A, 131 R, 134

[56] References Cited

U.S. PATENT DOCUMENTS

| 1,962,742 | 6/1934 | Jongedyk | 192/129 A |
| 2,082,210 | 6/1937 | McMaster | 192/129 A |
| 2,241,556 | 5/1941 | MacMillin | 192/130 |
| 2,311,441 | 2/1943 | James | 192/130 |
| 2,798,583 | 7/1957 | Jeszka | 192/130 |
| 3,276,557 | 10/1966 | Brown | 192/130 |

OTHER PUBLICATIONS

Sheet Metal Industries, Jun. 1977, vol. 54, No. 6, "Twenty-Five Years of Photo-Electric Guarding", by D. G. Harrison, pp. 536-539.
Sheet Metal Industries, Jun. 1977, vol. 54, No. 6, "Infra Red Lightscreens-The Right Approach to Photo-Electric Guards", pp. 550-556.

Primary Examiner—C. W. Lanham
Assistant Examiner—Gene P. Crosby
Attorney, Agent, or Firm—Armstrong, Nikaido, Marmelstein & Kubovcik

[57] ABSTRACT

A safety device for press brakes comprises light projectors mounted on the side of a lower beam of the press brake so as to form a plurality of horizontal light beams extending between a punch and a workpiece, light receivers mounted on the side of the lower beam so as to receive said light beams, and detector means mounted between said light receivers and a safety circuit and adapted to be actuated immediately before the interruption of the light beams when the punch interrupts them with the downward movement of a slide, thereby preventing the stopping of the operation of the press brake.

3 Claims, 2 Drawing Figures

SAFETY DEVICE FOR PRESS BRAKE

BACKGROUND OF THE INVENTION

1. Field of the Invention

This invention relates to a safety device for press brakes, and more particularly to an optically operated safety device for press brakes comprising light projectors mounted on one side thereof and light receivers mound on the other side thereof so as to form light beams between a punch and a workpiece to be subjected to bending work.

2. Description of the Prior Art

In the conventional press brakes, the operator's body or hand holding a workpiece to be bent or the workpiece which has been bent interrupts the light beams so that the optical safety device could not be put into practical use and so no suitable safety device has been available.

SUMMARY OF THE INVENTION

The present invention has been contemplated in view of the above-mentioned circumstances.

A principal object of the present invention is to provide a safety device for press brake adapted to stop the operation of the press brake so as to protect the operator from danger when the operator holds a workpiece to be bent in the region where he is liable to have his hand or finger nipped between the punch and the workpiece.

Another object of the present invention is to provide an optically operated safety device comprising light projectors mounted on one side of the press brake and light receivers mounted on the other side thereof so as to form light beams between the punch and the workpiece to be bent.

A further object of the present invention is to provide a safety device which can be adjusted in response to changes of the height of the punch arising from the replacement thereof.

A still further object of the present invention is to provide a safety device comprising means for protecting the operator from danger even when he has failed the adjustment thereof to be made in response to changes of the height of the punch.

In the press brake for bending a workpiece between a lower die mounted on a lower beam and a punch mounted on the lower face of a slide, the safety device for press brakes according to the present invention to achieve the above-mentioned objects is characterized by comprising light projector means mounted through a first bracket on one side of said lower beam; light receiver means mounted through a second bracket on the other side of the lower beam so as to form a plurality of light beams extending horizontally between said punch and said workpiece to be bent and located a predetermined distance apart from the centre line of descent of said punch on the side of the operator; a safety circuit means adapted to stop the operation of the press brake immediately when any of said light beams is interrupted by the operator's hand or finger; and a detector means connected between said safety circuit means and said light receiver means, said detector means being adapted to be actuated immediately before the interruption of said plurality of light beams when said punch interrupts them so as to prevent the stopping of operation of the press brake.

In the safety device of the present invention, the abovementioned detector means comprises a plurality of first limit switches for detecting slide position each mounted on said first bracket above said light projector means and having a terminal, and a first dog mounted through an upwardly extending support rod on the side of said slide facing said first bracket so as to render said first limit switches operative in turn with the downward movement of said slide.

The above-mentioned detector means has a further terminal and comprises a second limit switch for detecting height of the punch fitted to the leading end of said first bracket and connected with said safety circuit means, and a second dog fitted to the leading end of said support rod so as to actuate said second limit switch as said slide is moved downwards.

BRIEF DESCRIPTION OF THE DRAWINGS

Other objects, feature and advantages of the invention will be apparent from the following description taken in conjunction with the accompanying drawings in which.

DETAILED DESCRIPTION OF THE INVENTION

Figure 1:
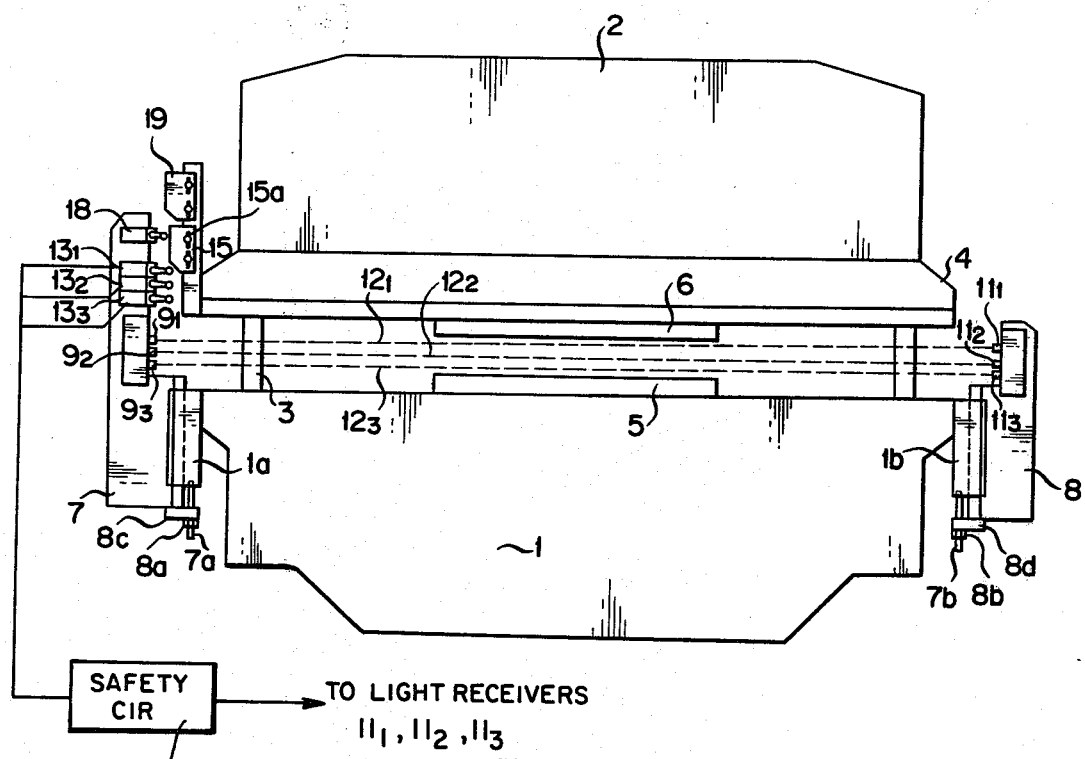
FIG. 1 is an overall front view of a press brake provided with a safety device according to the present invention.

One embodiment of the present invention will now be described with reference to the accompanying drawings. In FIG. 1, reference numeral 1 denotes a lower beam for the press brake, and 2 a slide driven unit supported by side frames 3 upstanding from the lower beam 1, said slide drive unit 2 having a freely vertically movable slide or upper beam 4 mounted thereunder. A lower die 5 is fitted to the upper face of the lower beam 1, whilst an upper die or punch 6 is fitted to the lower part of the slide 4 so that a workpiece inserted or located between the upper and lower dies can be subjected to a predetermined bending work.

In the thus constructed press brake, vertically extending guide members 1a and 1b are fixedly secured to both ends of the lower beam 1 and first and second brackets 7 and 8 are mounted to the guide members 1a and 1b, respectively, so that the former can be moved vertically along the latter. The vertical movements of the abovementioned brackets 7 and 8 are accomplished by means of adjusting bolts 7a and 7b fixedly secured, respectively, to the guide members 1a and 1b, support members 8c and 8d idly fitted in the bolts 7a and 7b and supporting the bottom faces of the brackets 7 and 8, respectively, and nuts 8a and 8b threadably engaged with the adjusting bolts 7a and 7b and supporting the support members 8c and 8d, respectively. Fitted to the bracket 7 are a plurality of, for example, three sets of light projectors $9_1$, $9_2$ and $9_3$, whilst fitted to the bracket 8 are light receivers $11_1$, $11_2$ and $11_3$ opposite to the projectors $9_1$, $9_2$ and $9_3$. The above-mentioned light projectors are all connected to a power source (not shown) so that they can send out light towards the light receivers $11_1$, $11_2$ and $11_3$ so as to form three rows of light beams $12_1$, $12_2$ and $12_3$ along the line of descent of the punch 6 and at positions located a predetermined distance $\delta$ apart from the centre line of descent on the side of the operator. Further, the above-mentioned light receivers are connected to a safety circuit means 20 which is adapted to momentarily stop the operation of the press brake when the light beams sent out by the light projectors $9_1$, $9_2$ and $9_3$ cannot reach one or more of the light receivers $11_1$, $11_2$ and $11_3$; that is, one or more of the light beams $12_1$, $12_2$ and $12_3$ is or are interrupted by something. The above-mentioned safety circuit means 20 is further connected to a detector means, for example, three sets of first limit switches $13_1$, $13_2$ and $13_3$ for detecting slide position fitted to the bracket 7. The limit switches $13_1$, $13_2$ and $13_3$ are adapted, when rendered operative, to open the above-mentioned safety circuit immediately before the punch 6 interrupts the light beams $12_1$, $12_2$ and $12_3$ so as to prevent the stoppage of the press brake in the normal condition. Further, a dog 15 adapted to actuate the limit switches $13_1$, $13_2$ and $13_3$ is adjustably fitted to an end face of the slide 4 on the side of the first bracket 7 through an upwardly extending support rod 16.

Further, fitted to the uppermost part of the first bracket 7 is a punch height detector means, for example, a limit switch 18. Still further, fitted adjustably to the leading end of the support rod 16 is a dog 19 which serves to actuate the limit switch 18. This punch height detector limit switch 18 is connected with the above-mentioned safety circuit.

The operation of the thus constructed press brake will now be explained below with reference to FIG. 2.

Figure 2:
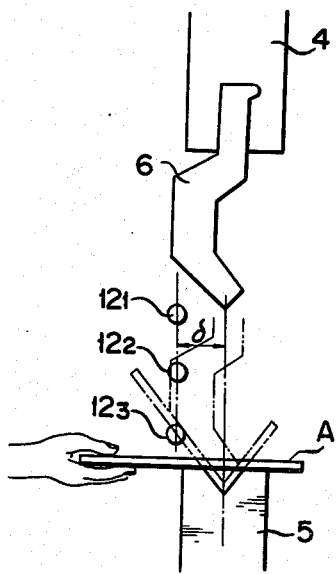
FIG. 2 is a partially schematic elevational view explaining the operation of the safety device.

When it is desired to bend a workpiece or flat plate "A" as shown by dotted lines in FIG. 2, it is held by the operator on the lower die 5, and the punch 6 is allowed to move down together with the slide 4. Upon the downward movement of the punch 6, immediately before the uppermost light beam $12_1$ is interrupted by the punch 6, the uppermost slide position detector limit switch $13_1$ is actuated by the dog 15 thereby opening the safety circuit. As a result, even when the punch 6 interrupts the light beam $12_1$ afterward, the safety device is not rendered operative so that the press brake can continue its operation. In the similar manner, immediately before the punch 6 interrupts the light beams $12_2$, and $12_3$, respectively, the limit switches $13_2$ and $13_3$ are actuated so as to open the safety circuit and render it inoperative thereby enabling the press brake to continue its operation. Thus, the punch 6 will reach its bottom dead centre, accomplishing the bending work of the workpiece "A" between the upper and lower dies 5 and 6. If, during the downward movement stroke of the punch 6, for example, any of the light beams $12_1$ to $12_3$ are interrupted by the operator's hand or finger, prior to the actuation of any of the limit switches $13_1$, $13_2$ and $13_3$ by the dog 15, the aforementioned safety circuit is rendered operative to stop the press brake momentarily thereby ensuring the safe operation of the operator.

In case the operator has forgotten the adjustment of the position of the dog 15 irrespective of the fact that the punch 6 has been replaced by another punch having an increased height, before the limit switches $13_1$, $13_2$ and $13_3$ are actuated, respectively, by the dog 15, the replaced punch will interrupt the light beams $12_1$, $12_2$ and $12_3$ thereby bringing the press brake to stop its operation. Therefore, the operator must adjust the position of the dog 15 before resuming the bending operation with replaced punch having an increased height.

Reversely, when the operator has forgotten the position adjustment of the dog 15 irrespective of the fact that the punch 6 has been replaced by another punch having a lower height, considerably before the replaced punch passes through the light beams $12_1$, $12_2$ and $12_3$, the limit switches $13_1$ to $13_3$ are actuated by the dog 15 thereby opening the safety circuit and render the effect of the light beams $12_1$, $12_2$ and $12_3$ inoperative. Therefore, even if the operator's hand is located between the punch and the workpiece so as to interrupt any of the light beams $12_1$, $12_2$ and $12_3$, the press brake will continue its operation. In order to protect the operator from such risk, the arrangement is made such that as the slide 4 moves downwards, the punch height detector limit switch 18 is actuated by the dog 19, thereby closing or actuating the safety circuit and immediately stopping the operation of the press brake.

While the invention has been described and shown with particular reference to the preferred embodiment, it will be apparent that variations might be possible that would fall within the scope of the present invention, which is not intended to be limited except as defined in the following claims.

We claim:

1. In a press brake for bending a workpiece between a lower die mounted on a lower beam of the press brake and a punch mounted on the lower face of a slide, a safety device comprising light projector means mounted through a first bracket on one side of said lower beam; light receiver means mounted through a second bracket on the other side of the lower beam so as to form a plurality of light beams extending horizontally between said punch and said workpiece, said light beams being located a predetermined distance apart from the centre line of descent of said punch on the side of the operator; a safety circuit means adapted to stop the operation of the press brake immediately when any of said light beams are interrupted by an operator's hand or finger; and a detector means connected between said safety circuit means and said light receiver means, said detector means being adapted to be actuated immediately before the interruption of said plurality of light beams by the punch thereby opening said safety circuit and allowing the operation of the press brake to continue.

2. The safety device as set forth in claim 1, wherein said detector means comprises a plurality of first limit switches for detecting the slide position each mounted on said first bracket above said light projector and having a terminal, and a first dog mounted through an upwardly extending support rod on the side face of said slide facing said first bracket so as to render said first limit switches operative in turn with the downward movement of said slide.

3. The safety device as set forth in claim 2, wherein said detector means has a further terminal, and comprises a second limit switch for detecting punch height fitted to the leading end of said first bracket and connected with said safety circuit, and a second dog fitted to the leading end of said support rod so as to actuate said second limit switch as said slide is moved downwards.

* * * * *